United States Patent
Burkey et al.

(10) Patent No.: US 7,611,183 B2
(45) Date of Patent: Nov. 3, 2009

(54) PASSENGER SEAT HAVING DRIVER-ACCESSIBLE STORAGE MODULES

(75) Inventors: William Burkey, Kamuela, HI (US); Caroline M. Conley, Hermosa Beach, CA (US); Alyssa Haney, Pittsburgh, PA (US); Monica R. Mehaffey, Pittsburgh, PA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 34 days.

(21) Appl. No.: 11/958,930

(22) Filed: Dec. 18, 2007

(65) Prior Publication Data

US 2008/0164712 A1 Jul. 10, 2008

Related U.S. Application Data

(60) Provisional application No. 60/883,538, filed on Jan. 5, 2007.

(51) Int. Cl.
*B60R 7/04* (2006.01)

(52) U.S. Cl. .............................. 296/37.15; 297/188.07

(58) Field of Classification Search ............ 296/37.15, 296/24.34, 37.8; 297/188.04, 188.07
See application file for complete search history.

(56) References Cited

U.S. PATENT DOCUMENTS

| | | | | |
|---|---|---|---|---|
| 3,580,650 | A | * | 5/1971 | Morris ....................... 312/7.1 |
| 3,596,987 | A | * | 8/1971 | Wilson ................... 297/188.07 |
| 3,961,721 | A | * | 6/1976 | Gordon et al. ............... 220/230 |
| 5,716,091 | A | | 2/1998 | Wieczorek |
| 5,913,570 | A | | 6/1999 | Yoshida et al. |
| 5,947,033 | A | * | 9/1999 | Lombardo ................... 108/44 |
| 5,975,612 | A | | 11/1999 | Macey et al. |
| 6,059,358 | A | * | 5/2000 | Demick et al. ......... 297/188.04 |
| 6,199,948 | B1 | * | 3/2001 | Bush et al. ............... 297/217.3 |
| 6,220,660 | B1 | | 4/2001 | Bedro et al. |
| 6,474,739 | B1 | | 11/2002 | Lagerweij |
| 6,499,787 | B2 | | 12/2002 | Jach et al. |
| 6,929,304 | B1 | * | 8/2005 | Dry et al. ................... 296/37.8 |
| 6,986,175 | B2 | | 1/2006 | Maas |
| 7,066,541 | B2 | | 6/2006 | Uramichi |
| 7,121,606 | B2 | | 10/2006 | Khan et al. |
| 7,303,226 | B2 | * | 12/2007 | Bernstein et al. ....... 296/190.01 |
| 7,318,616 | B1 | * | 1/2008 | Bradley ................... 296/37.15 |
| 7,455,204 | B2 | * | 11/2008 | Lippert et al. ............... 224/275 |
| 2005/0151398 | A1 | * | 7/2005 | Sitzler et al. ................ 296/218 |

FOREIGN PATENT DOCUMENTS

JP 2000001152 * 1/2000

* cited by examiner

*Primary Examiner*—Dennis H Pedder
(74) *Attorney, Agent, or Firm*—Jeffrey P. Calfa; Mark C. Bach

(57) ABSTRACT

A passenger's seat (20) has a seat cushion (28) and a seat back (30) that can fold down onto the seat cushion. A storage module (34) is recessed into the rear of the seat back and can be conveniently accessed by a driver in a driver's seat (22) along side the passenger' seat when the passenger's seat's seat back is folded onto its seat cushion. The driver can also pull a storage bin (32) out from underneath the passenger's seat to access the interior of the bin.

6 Claims, 8 Drawing Sheets

PASSENGER SEAT HAVING DRIVER-ACCESSIBLE STORAGE MODULES

REFERENCE TO RELATED APPLICATION AND PRIORITY CLAIM

This application claims the priority of Provisional Patent Application No. 60/883,538, filed on Jan. 5, 2007, the entire content of which is incorporated herein by reference.

FIELD OF THE INVENTION

This invention relates generally to motor vehicles, especially large highway trucks, that have a passenger seat to one side of a driver's seat. More particularly, the invention relates to a passenger seat that contains driver-accessible storage modules.

BACKGROUND OF THE INVENTION

A long-haul professional truck driver spends his/her working hours seated in a truck. Depending on circumstance, the driver may need to obtain access to one or more various items, sometimes of a personal nature, while driving on the road. Consequently, convenient access to such items is obviously desirable.

While certain current production truck models that have sleeper compartments at the rear of the cab offer various options for personal storage, driver access to stored items in that area is at best difficult, and more likely impossible, while the driver is seated in the driver's seat. Smaller cabs that lack sleeper compartments have less available storage space.

Through survey information, the inventors have found that out of necessity, or preference, drivers keep some items within easy reach while driving and that when suitable storage space for such items simply isn't present in their trucks, the drivers create their own improvised storage arrangements using boxes, milk carton crates, etc., or they just leave items unorganized on the cab floor, dash, or console.

The inventors have also discovered that the importance of accessible storage to a driver seems to increase with a driver's age. Because older drivers often find it more difficult to stretch in order to retrieve far away items and to reach down in order to retrieve articles from the floor, they are more likely than younger ones to consider accessible storage especially important. They also tend to want better organization that allows certain personal items, such as medications, to be quickly found and easily reached when needed. Convenient storage and access to items creates a better working environment for the driver and promotes driver satisfaction.

SUMMARY OF THE INVENTION

The present invention relates to storage modules that are incorporated into the passenger seat of a vehicle and well-suited to address needs of professional truck drivers. By their placement in a passenger seat, the modules can be stowed out of the way when not being used, yet when needed, can be opened and conveniently accessed by the driver seated in the driver's seat.

While a passenger or driving partner may also accompany a truck driver, the inventors have found from their survey that many trucks are occupied only by the driver. Consequently, the inventors' recognition that the passenger seat adjacent to the driver's seat is seldom occupied has led them to advantageously use the passenger seat as a convenient location for storage modules.

In the disclosed embodiment of the invention there are two storage modules, one an underseat module, the other a seat back module. The seat back module is installed in the rear of the passenger seat's seat back, and is made available for driver use by folding the seat back down and forward onto the passenger seat's seat cushion. The underseat module is installed in a base of the passenger's seat, and comprises a storage bin that is mounted on the base by drawer slides that allow the bin to be easily pulled out for access. The modules can be used in both sleeper cabs and non-sleeper cabs.

In addition to their functional attributes, the modules possess elements of good craftsmanship, pleasing visual and tactile aesthetics, and durability, thus ensuring their desirability by customers and users.

One generic aspect of the invention relates to a vehicle driver/passenger compartment comprising a driver's seat on one side and a passenger's seat on an opposite side. The passenger's seat comprises a seat cushion and a seat back that can fold down onto the seat cushion. A module is recessed into the rear of the seat back.

The module comprises a basin having an inner wall that, when the passenger's seat's seat back is folded onto its seat cushion, is disposed generally horizontal and a side wall that bounds a perimeter of the inner wall and sets the depth of the inner wall from an open face of the basin. The module also has a closure that, when the passenger seat's seat back is folded onto its seat cushion, is movable from a generally horizontal position closing the open face of the basin to a generally horizontal position that is toward the driver along side the open face of the basin and that uncovers at least a portion of the open face of the basin.

Another generic aspect relates to a vehicle driver/passenger compartment comprising a driver's seat on one side and a passenger's seat on an opposite side. The passenger's seat comprises a seat cushion and a seat back. The passenger's seat comprises a base that supports the seat cushion vertically above a floor of the compartment to provide an open interior space between the floor and the seat cushion. A storage bin occupies that space and can be moved outward toward the driver's seat through an opening in the base.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
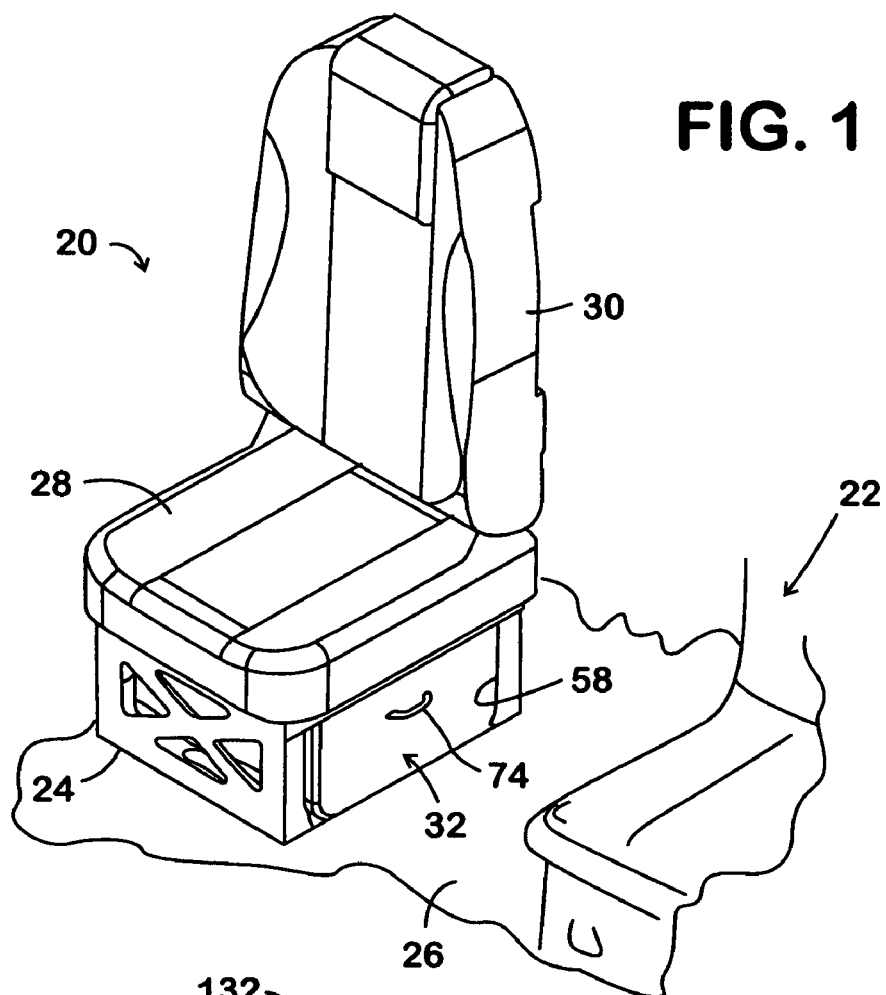
FIG. 1 is a perspective view of a passenger's seat in a truck cab embodying principles of the invention, the seat back being in upright position, and the seat being to the right of a driver's seat.
Figure 2:
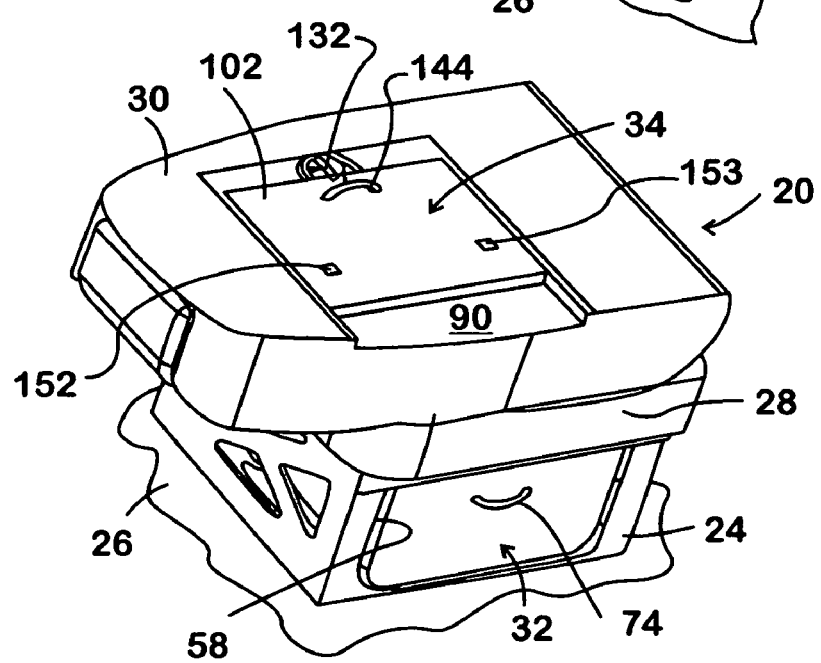
FIG. 2 is a perspective view of the passenger's seat with the seat back folded onto the seat cushion.

FIGS. 1 and 2 show a passenger's seat 20 in the cab of a large highway truck to the right of a driver's seat 22 that is only partially shown. Seat 20 comprises a base 24 mounted on a floor 26 of the cab, a seat cushion 28 mounted atop base 24, and a seat back 30 that is shown upright in FIG. 1, but in FIG. 2 is shown swung forward and down onto cushion 28.

In accordance with principles of the invention, a storage bin 32 is stowed within otherwise unoccupied interior space of base 24 underneath cushion 28, and a module 34, shown closed in FIG. 2, is recessed into the rear of seat back 30.

Figure 3:
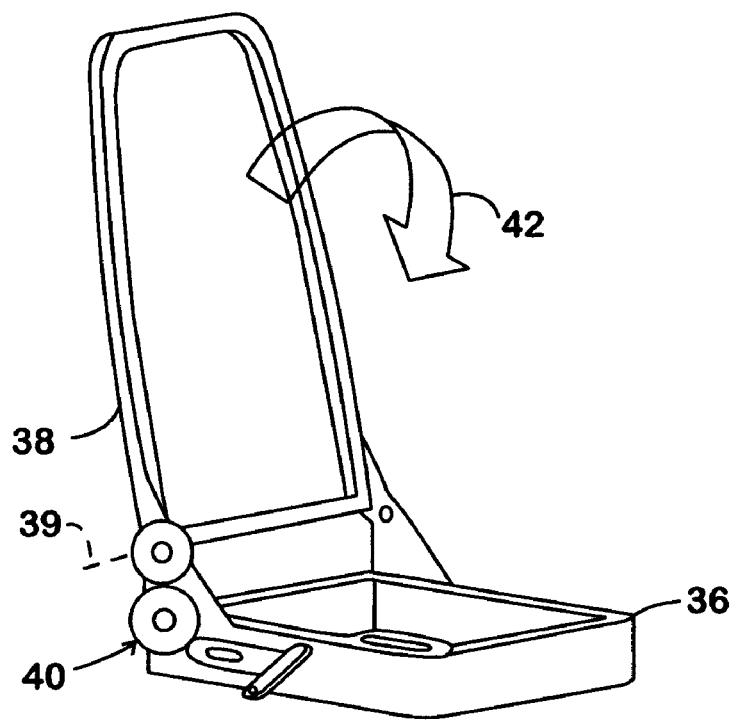
FIG. 3 is a perspective view showing the seat frame with the back upright.

Seat 20 comprises a structural framework shown in FIG. 3 to comprise a cushion frame 36 via which seat 20 is attached to base 24, a back frame 38 for seat back 30 having a lower end that is pivotally mounted on the rear of cushion frame 36, and a mechanism 40 that locks seat back 30 in place but can be released to allow the seat back to be folded about a pivot axis 39 downward and forward from the upright position shown in FIG. 1 onto seat cushion 28, as suggested by arrow 42 in FIG. 3, to make seat back 30 generally horizontal. The seat and back frames are constructed in any conventional manner to provide the necessary strength, and they are then covered in conventional manner by resilient materials, foams, pads, etc., and finally outer fabric or leather to provide desired finished appearance, seating comfort, and durability.

Figure 4:
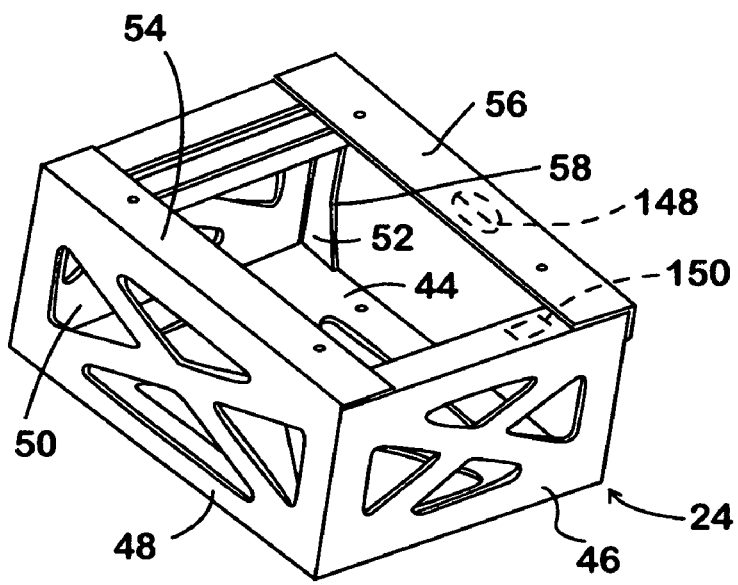
FIG. 4 is a perspective view of the seat base.
Figure 5:
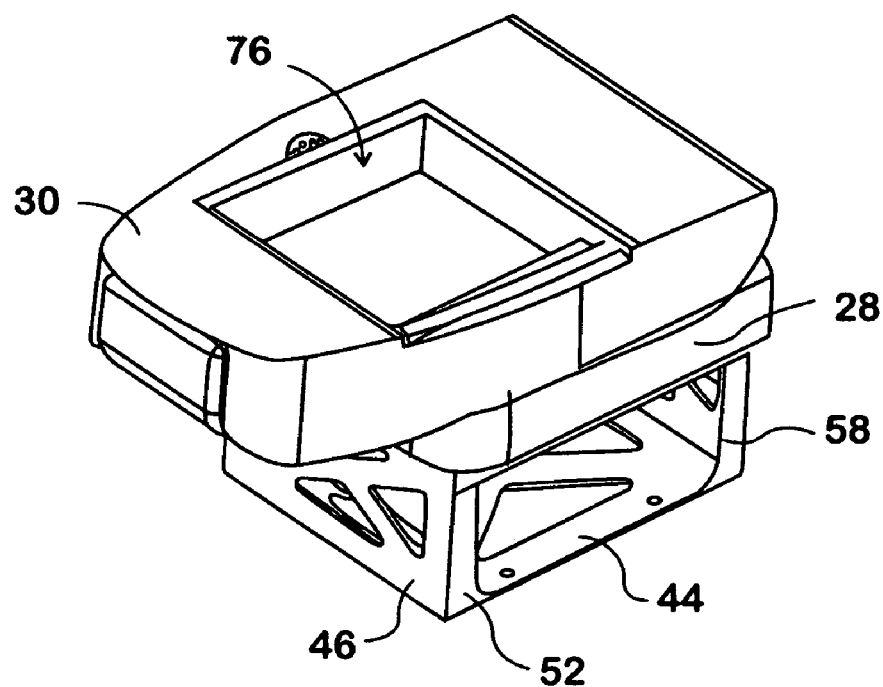
FIG. 5 is a perspective view similar to FIG. 2 but with a portion removed for illustrative convenience in order to show a basin that is recessed into the seat back.

As shown by FIGS. 4 and 5, base 24 comprises several formed metal panels assembled together, such as by welding, to provide a generally box-like structure having a bottom 44 for attaching to floor 26, and four generally vertical sides 46, 48, 50, and 52. Sides 48 and 52 include respective horizontal flanges 54, 56 that provide for the attachment of seat frame 36 to base 24. Bottom 44 and sides 46, 48, 50 have openings that leave diagonal cross-braces joining corners of their rectangular margins. Side 52 has a single larger opening 58 whose height and width are slightly larger than the height and width of storage bin 32.

Figure 6:
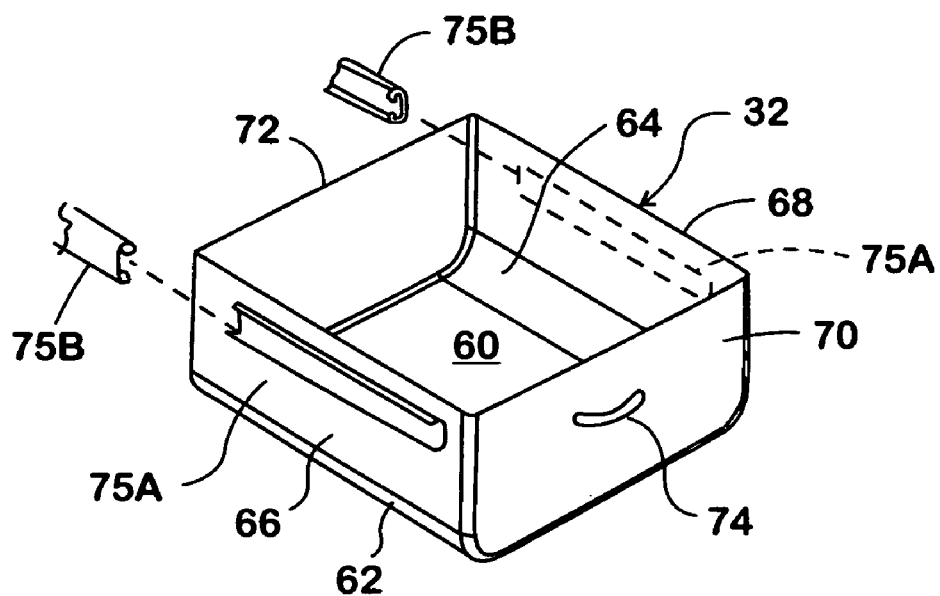
FIG. 6 is a perspective view of an underseat storage bin.
Figure 7:
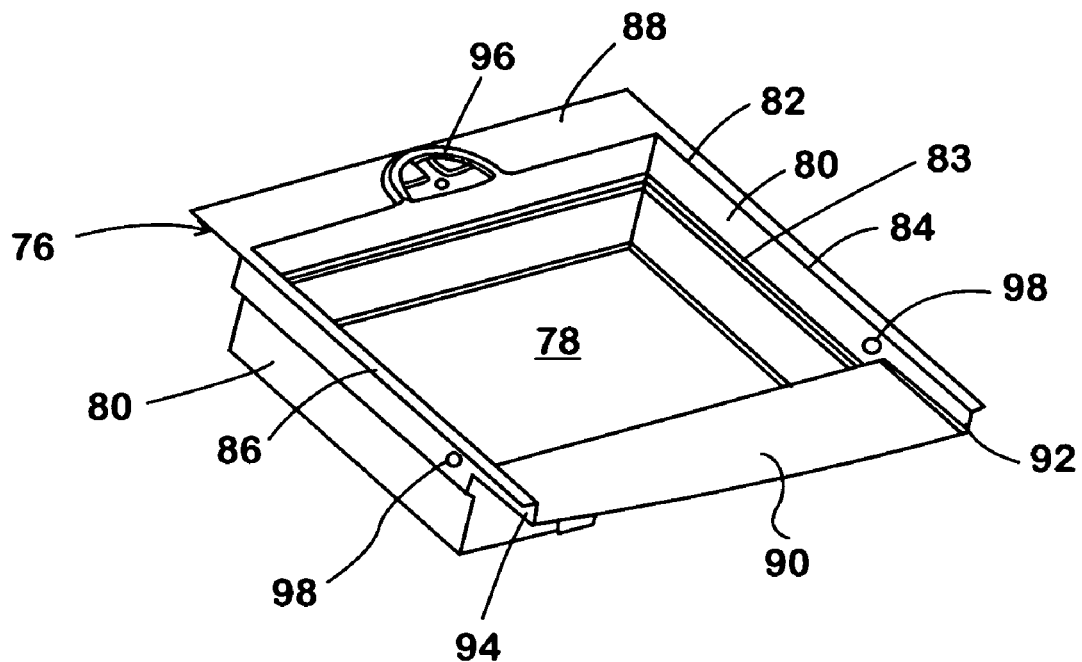
FIG. 7 is a perspective view showing more detail of the basin seen in FIG. 5.
Figure 8:
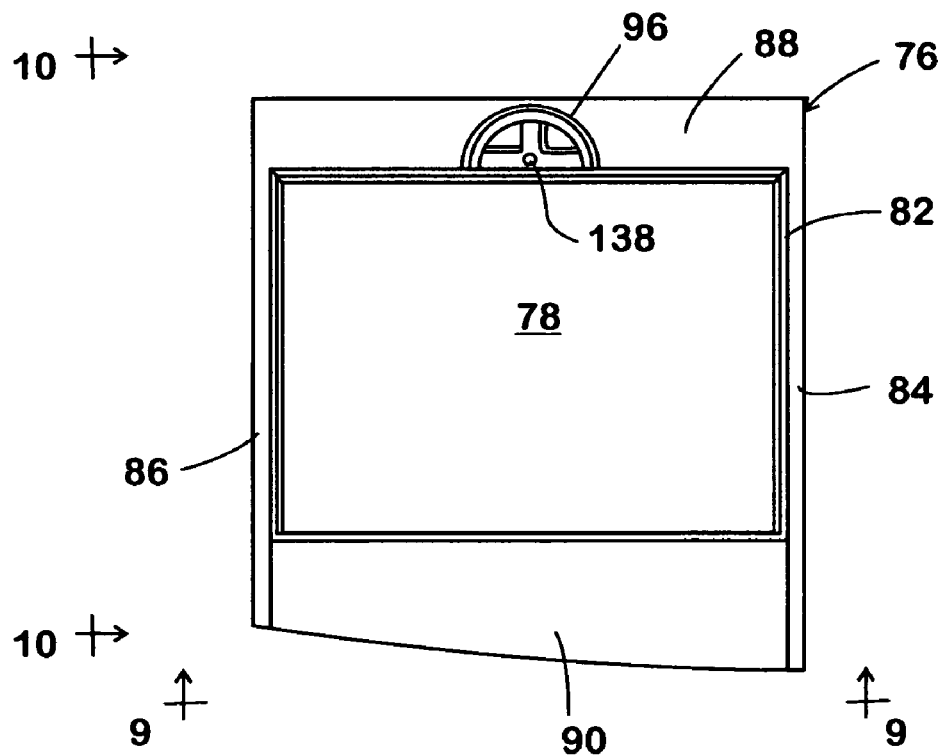
FIG. 8 is a top plan view of FIG. 7.
Figure 9:
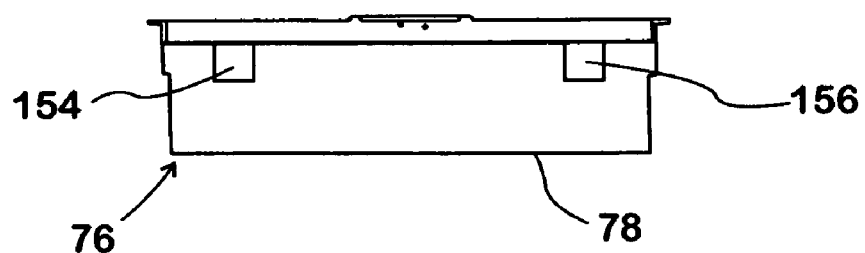
FIG. 9 is a view in the direction of arrows 9-9 in FIG. 8.
Figure 10:
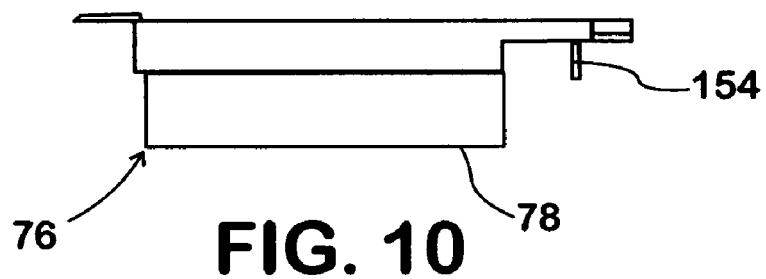
FIG. 10 is a view in the direction of arrows 10-10 in FIG. 8.

Storage bin 32 is shown by itself in FIG. 6 to comprise a bottom wall 60 whose side margins 62, 64 curve upward as they merge into respective side walls 66, 68. The front and rear of the bin are completed by front and back walls 70, 72. A pull handle 74 is fastened to the bin at the front of front wall 70.

As shown by FIGS. 1 and 2, storage bin 32 fits within the open interior space of base 24 when stowed. When handle 74 is manually grasped by a driver seated in driver's seat 22 and pulled, bin 32 is pulled out from under the passenger's seat through opening 58 to provide the driver with access to the interior of the bin. The bin is returned to stowed position by pushing it back into the open interior space of base 24.

Bin 32 doesn't slide along bottom 44, but rather on drawer slides. A first part 75A of each of a pair of drawer slides is attached, such as by rivets to a respective side wall 66, 68 of bin 32 as shown in FIG. 6. A second part 75B of each drawer slide is mounted to base 24 within the open interior space. The slides have a positive but releasable stop, that once the respective slide parts have been engaged, prevents bin 32 from being pulled out and separating from the base-mounted slide parts 75B unless the stop has been released.

FIG. 5 shows that the rear of seat back 30 contains a recess within which a basin 76 is disposed substantially flush with the rear of the seat back. The basin is secured to the seat back in any suitably appropriate way.

Basin 76 is shown by itself in FIGS. 7-10 and comprises a flat inner wall 78 that is disposed generally horizontal when seat back 30 is folded onto seat cushion 28 and a side wall 80 that bounds the perimeter of inner wall 78 and sets the depth of inner wall 78 from an open rectangular face 82 of the basin. The particular side wall shown has a small step 83 about midway of its depth.

Narrow flanges 84, 86 extend outward from open face 82 along opposite sides of basin 76 that run widthwise of seat back 30. At the far side of basin 76 relative to driver's seat 22, a wider flange 88 extending outward from open face 82 joins flanges 84, 86. A ledge 90 is at the side of basin 76 that is toward the driver's seat opposite flange 88. Short vertical walls 92, 94 join flanges 84, 86 with opposite edges of ledge 90 that are parallel with the lengths of the flanges so that ledge 90 is depressed from a plane containing the upper surfaces of flanges 84, 86, and 88 and the open face 82 of the basin. The edge of ledge 90 that is toward driver's seat 22 is curved for substantial congruence with the curved edge of seat back 30 that is also toward the driver's seat. At the center of its length, flange 88 has a formation 96 for mounting a latch that will be described later.

As shown by FIGS. 2 and 5, flanges 84, 86, and 88 fit substantially flush with the rear face of seat back 30. Along the side that is toward the driver's seat, seat back 30 is shaped such that ledge 90 is recessed to the depth of the short walls 92, 94. The opposite widthwise extending portions of side wall 80 contain aligned holes 98 a short distance below flanges 84, 86 and slightly inward of ledge 90 for holding hold pins 100 (one of which can be seen in FIGS. 14, 15, and 16).

Figure 14:
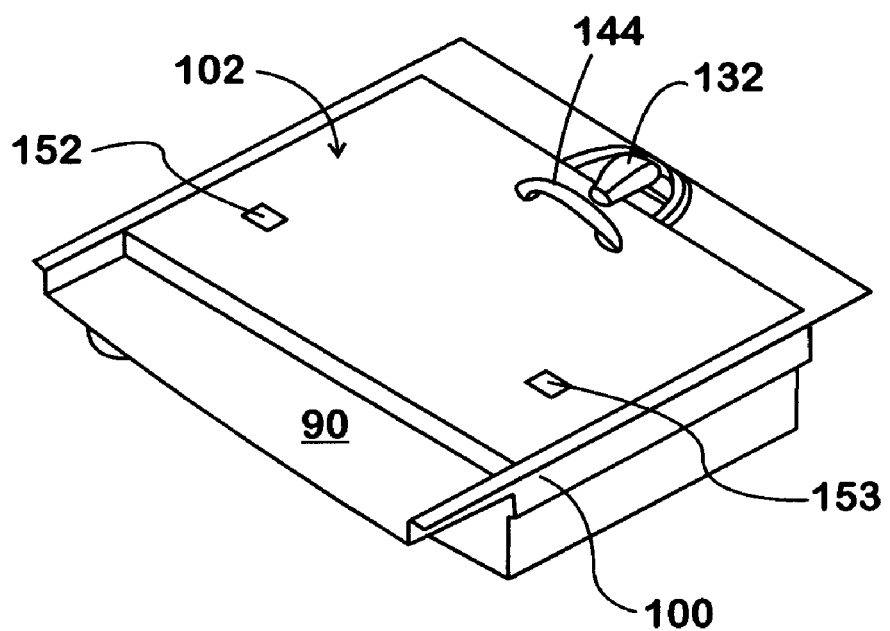
FIG. 14 is a perspective view, showing closed position, of a module that comprises the basin, the tray, and the cover and hinge assembly.
Figure 15:
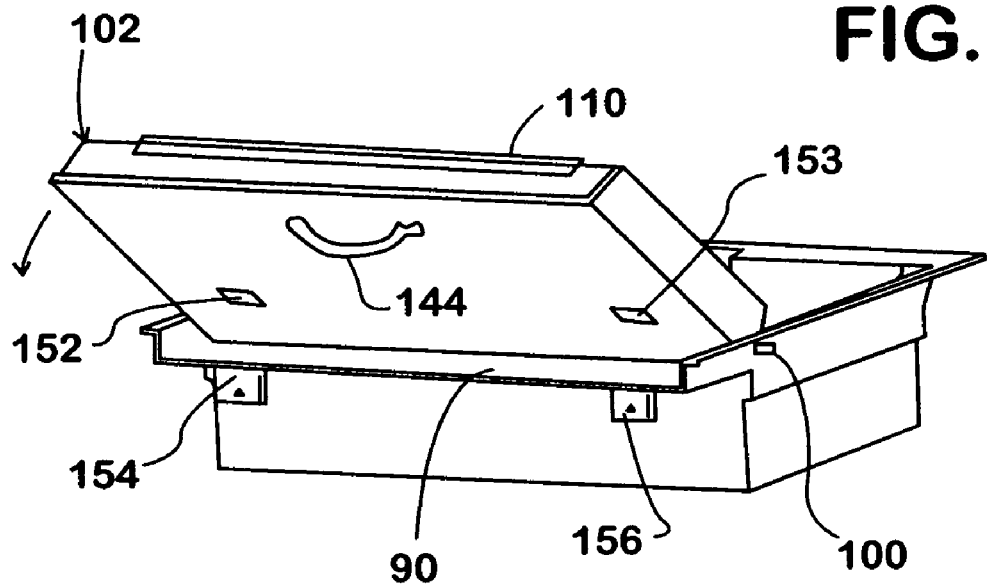
FIG. 15 is a perspective view of the module shown in the process of being opened.

Pins 100 provide a pivotal mounting for a closure 102 that, when seat back 30 is folded onto seat cushion 28, can swing from a generally horizontal position closing open face 82 of basin 76, as shown in FIGS. 2 and 14, to a generally horizontal position that is toward driver's seat 22 along side the open face 82 of the basin and that uncovers at least a portion of open face 82. FIG. 15 shows closure 102 in the process of being swung open before it finally comes to rest on ledge 90.

Figure 11:
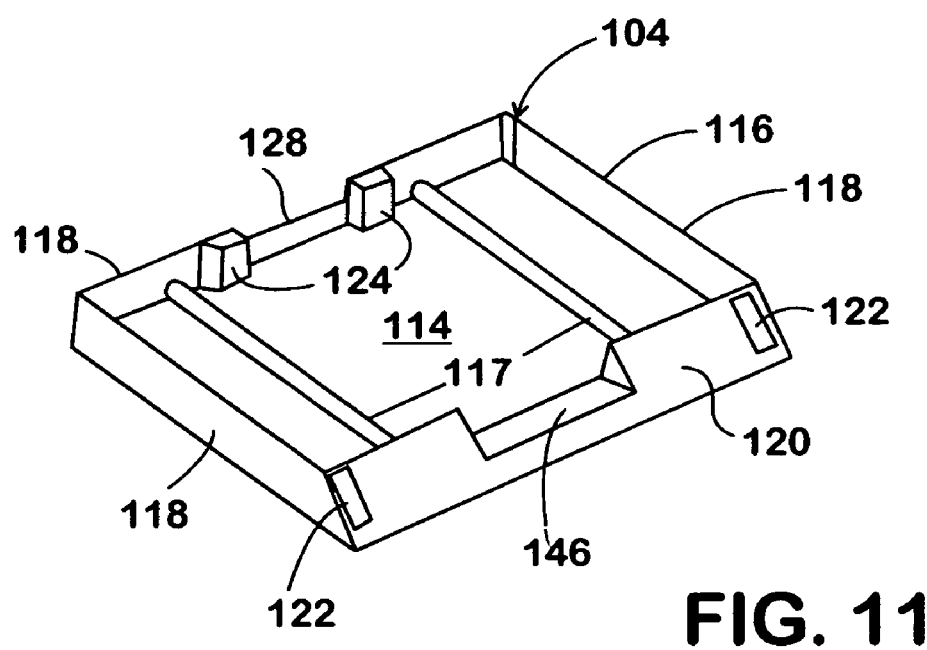
FIG. 11 is a perspective view showing a tray.
Figure 12:
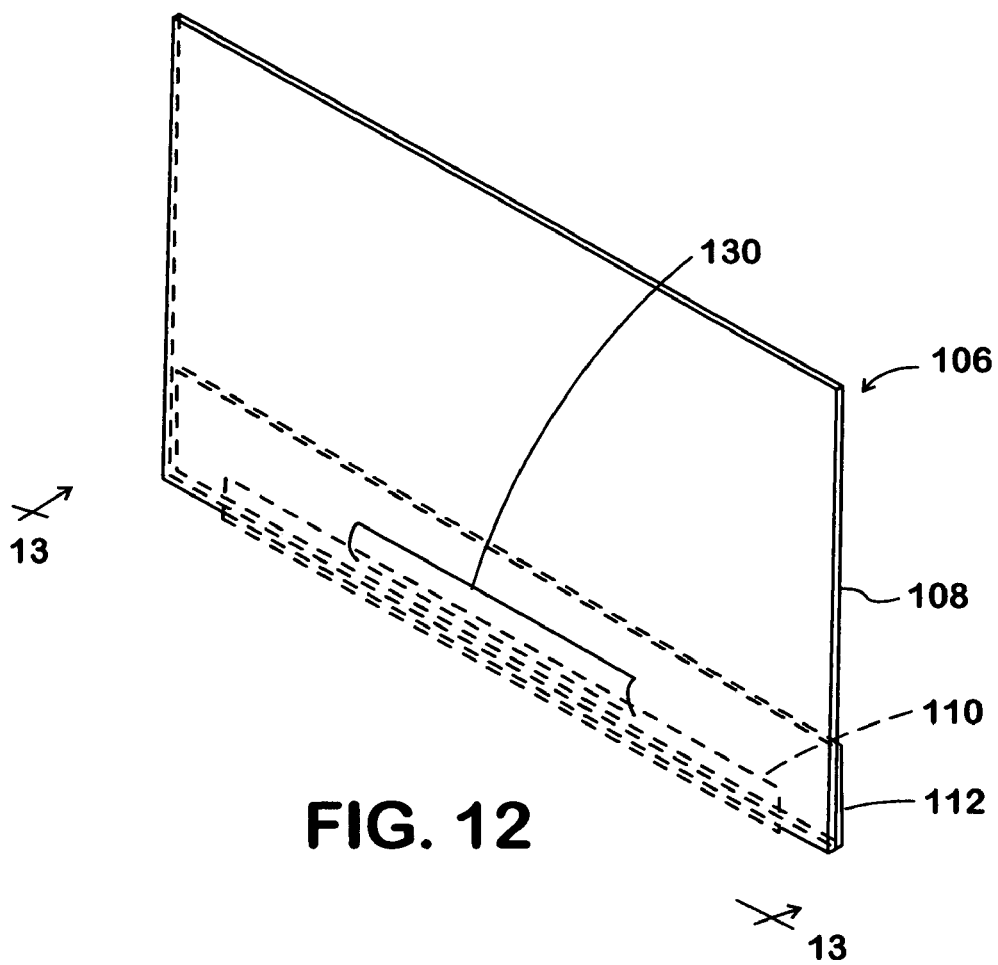
FIG. 12 is a perspective view of a cover and hinge assembly.
Figure 13:
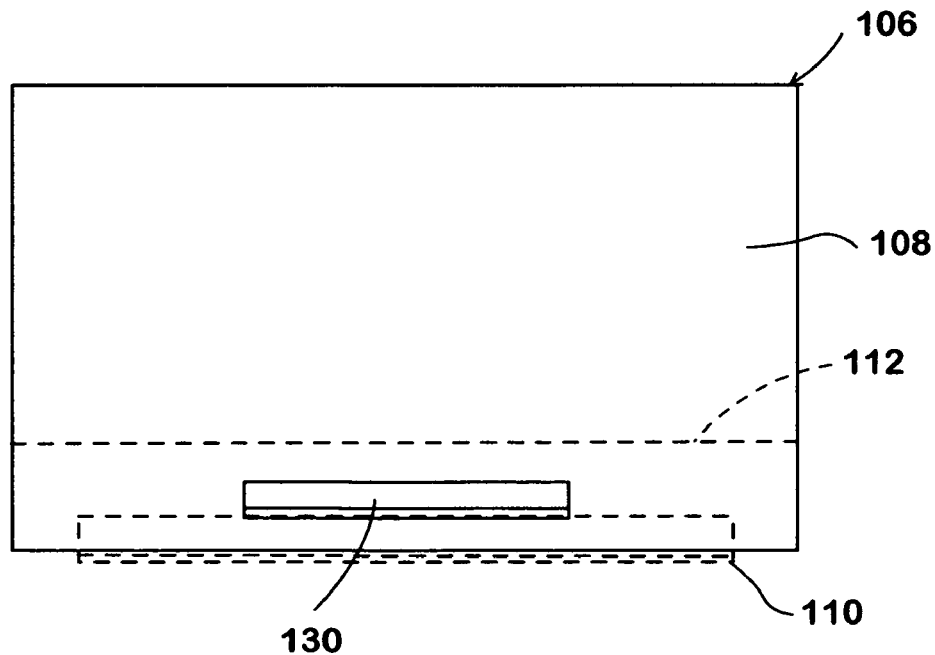
FIG. 13 is a plan view of the cover and hinge assembly in the direction of arrows 13-13 in FIG. 12.

Closure 102 comprises an assembly of several parts that are shown in FIGS. 11-13. One part is a generally rectangular tray 104 shown by itself in FIG. 11; another is a cover and hinge assembly 106 that is shown by itself in FIGS. 12 and 13 to comprise a flat rectangular cover 108, a piano hinge 110, and a flat rectangular mounting bar 112.

Figure 16:
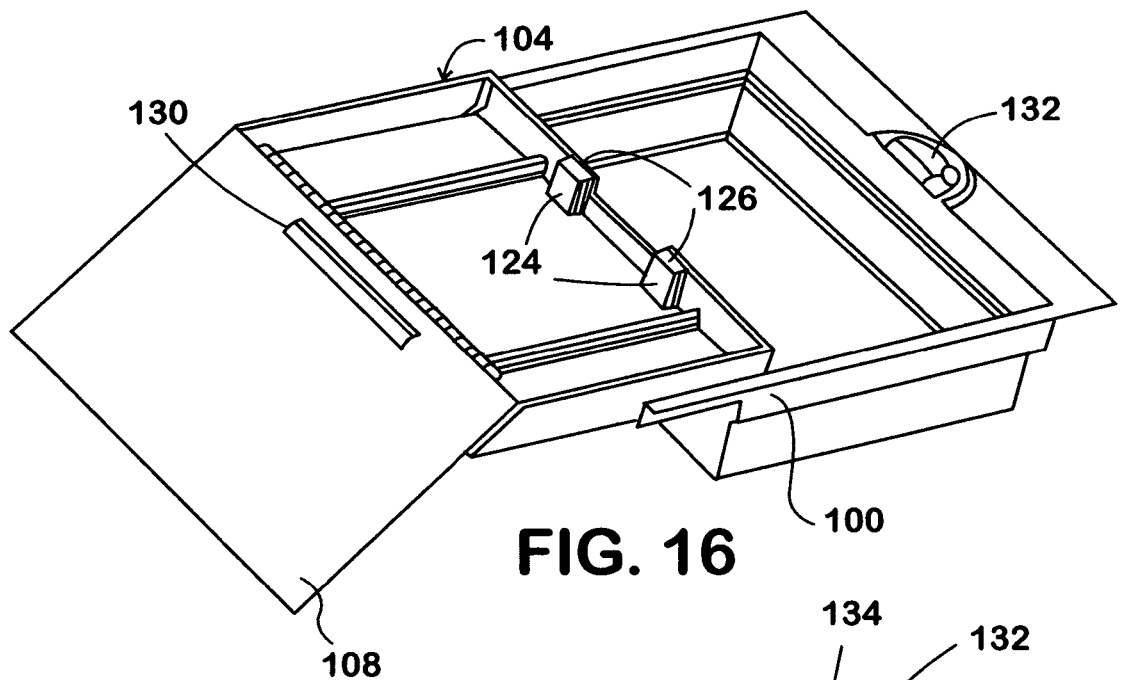
FIG. 16 is a perspective view of the module showing a full open position.

Tray 104 comprises a bottom wall 114 depressed to a depth shallower than the depth of basin 76 and an open face 116 opposite bottom wall 114 to allow articles to be placed onto and removed from the interior of the tray when closure 102 assumes the generally horizontal position that is toward the driver along side the open face of the basin, such as shown in FIG. 16, which also shows cover 108 open to allow access to the interior of the tray. Bottom wall 114 incorporates integral bars 117 that provide structural reinforcement while dividing the tray into several tray compartments.

Tray 104 comprises a side wall 118 bounding the perimeter of bottom wall 114. Along the side that is toward driver's seat 22, wall 118 has a downwardly inclined surface 120 against which cover 108 is disposed when in the downwardly inclined position toward the driver's seat as shown in FIG. 16.

FIGS. 12 and 13 show that one of the longer side margins of cover 108 is fastened to one leaf of hinge 110. Bar 112 is fastened to the other leaf. By making both cover 108 and bar 112 of magnetic material, such as a magnetic steel, assembly 106 can be removably mounted on tray 104. Opposite ends of surface 120 contain pockets for mounting small permanent magnets 122 substantially flush with surface 120. Placement of bar 112 flat against inclined surface 120 with the hinge axis parallel and adjacent to the upper edge of surface 120 as in FIG. 16 will cause magnets 122 to hold assembly 106 in place so that cover 108 can be swung on tray 104 to cover and uncover the open face 116 of the tray.

The magnetic material of cover 108 is used for keeping it closed on tray 104. Tray 104 comprises receptacles 124 for holding small permanent magnets 126 along the side of wall 118 opposite the side that contains surface 120. When cover 108 is closed on tray 104, the margin of the cover opposite hinge 110 is magnetically held by magnets 126. To facilitate breaking the magnetic force holding the cover closed, the height of side wall 118 between receptacles 124 (reference numeral 128) is slightly reduced to allow a person's fingertips to better grip the edge of the cover when opening it.

The magnetic mounting of assembly 106 on tray 104 allows the assembly to be removed by pulling it with sufficient force to overcome the holding force of the magnets. The ability to repeatedly separate assembly 106 from tray 104 and then re-attach it to the tray is advantageous when one realizes that cover 108, besides being a cover for the tray also functions as a clipboard onto which a driver can clip sheet material like maps, travel logs, reports, etc.

As shown in FIGS. 12, 13, and 16, a spring-loaded clip 130 is fastened to cover 108 along the margin of the long side of the cover that is attached to hinge 110. With the cover deployed as shown by FIG. 16, sheet materials like the ones mentioned can be placed on the cover face and with the driver holding the clip open, slid under the clip. When the clip is released, it will hold the materials on the cover face where the driver can readily see them and write on them if needed. Hence cover 108 and clip 130 effectively form a clipboard, and because assembly 106 is separable from tray 104, the driver can remove the clipboard as needed, and thereafter re-attach it to the tray. Even with assembly 106 removed from tray 104, the tray can still be swung closed on basin 76.

Figure 17:
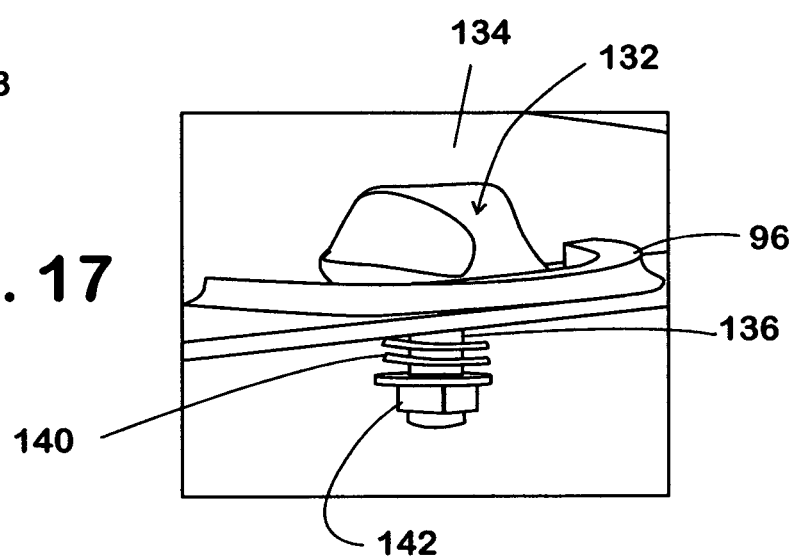
FIG. 17 is an enlarged perspective view in the direction of arrow 17 in FIG. 16 showing a latch in latched position.

Regardless of whether assembly 106 is present on the tray, a latch 132 that associates with formation 96 is used to keep closure 102 closed on basin 76. Enlarged detail of latch 132 is presented in FIGS. 17 and 18 to show that latch 132 comprises a body 134 supported on an end of a stub shaft 136 that mounts the latch in a hole 138 of formation 96. A helical spring 140 is disposed around shaft 136 and held compressed by a washer and fastener 142 on the shaft between that washer and the portion of formation 96 surrounding hole 138. In this way the latch can turn about the axis of the shaft, with limited movement along the length of shaft 136, allowed by spring 140 while the spring keeps forcing body 134 back toward flange 88.

Figure 18:
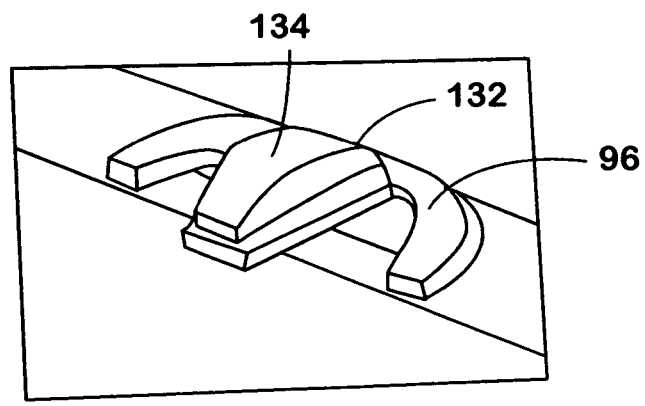
FIG. 18 is another perspective view of the latch from a different direction.

FIG. 16 shows latch 132 in non-latching position with body 134 clear of open face 82. FIG. 18 shows latch 132 turned 90º from the position in FIG. 16 with the pointed end of body 134 now over open face 82. This is the same position shown in FIG. 14 where, with closure 102 closed, the latch has been turned from the FIG. 16 position that allowed closure 102 to be closed, to now place the pointed end of body 134 over the outside of the bottom wall 114 of tray 104 to latch closure 102 closed. When it is desired to open closure 102, latch 132 is turned to the non-latching position, and closure 102 is then swung open by grasping a pull handle 144 on the outside of bottom wall 114. Pull handle 144 is a separate part, like pull handle 74, and is fastened to tray 104.

As shown by FIGS. 14 and 15, the outside of bottom wall 114 of tray 104 comprises two shallow rectangular pockets in which two small rectangular ferromagnetic pieces 152, 153 are retained. The underside of ledge 90 contains holders that hold permanent magnets 154, 156. When tray 104 has been swung fully open against ledge 90, the magnetic force between each magnet and the overlying ferromagnetic piece aids in preventing the tray from vibrating or bouncing on the ledge when the vehicle is operating and the tray is open. The magnetic forces are not so great as to make separation difficult when the tray is to be swung closed.

Whenever assembly 106 is in place on tray 104 when closure 102 is closed, space for clip 130 is provided by a recess 146 in the side of wall 118 that contains surface 120.

Several of the parts that have been described can be fabricated by molding suitable synthetic materials to the particular part shape. The synthetic materials that are used should be selected to provide proper strength, dimensional stability, and durability. Basin 76, tray 104, and bin 32 are examples of such parts. The use of molding processes allows features such as formation 96, receptacles 124, and bars 117 to be integrated into their respective parts.

It is believed that adequate nighttime illumination of module 34 can be provided by existing interior lighting. That may not be true for storage bin 32, in which case a small lamp 148 can be mounted on the inside of base 24 above opening 58 for shining down onto the interior of bin 32 when the bin has been pulled out. The lamp is shielded from the direct view of the driver. FIG. 4 shows lamp 148 mounted on the lower face of flange 54 which spans opening 58 between sides 46 and 50 and above the bin. Operation of lamp 148 is controlled by a switch 150 that enables lamp 148 to illuminate when the bin has been pulled out a certain distance. Actual illumination of the lamp may be conditioned on other electric controls.

While a presently preferred embodiment of the invention has been illustrated and described, it should be appreciated that principles of the invention apply to all embodiments falling within the scope of the following claims.

What is claimed is:

1. A vehicle driver/passenger compartment comprising:
   a driver's seat on one side of the driver/passenger compartment and a passenger's seat on an opposite side of the driver/passenger compartment;
   the passenger's seat comprising a seat cushion and a seat back that can fold down onto the seat cushion; and
   a module recessed into a rear of the seat back, the module comprising a basin having an inner wall that is disposed generally horizontal when the passenger's seat's seat back is folded onto its seat cushion and a side wall that bounds a perimeter of the inner wall and sets depth of the inner wall from an open face of the basin, and a closure that, when the passenger seat's seat back is folded onto the passenger seat's seat cushion, can swing from a generally horizontal position closing the open face of the basin to a generally horizontal position that is toward the driver's seat along side the open face of the basin and uncovers at least a portion of the open face of the basin, in which the closure comprises a tray that has a bottom wall depressed to a depth shallower than the depth of the basin and that has an open face opposite the bottom wall to allow articles to be placed onto and removed from the tray when the closure assumes the generally horizontal position that is toward the driver's seat along side the open face of the basin and a cover for closing the open face of the tray, and with the closure assuming the generally horizontal position that is toward the driver's seat along side the open face of the basin, the cover can be moved from a position closing the open face of the tray to a position that is toward the driver's seat and uncovers the open face of the tray;

wherein the cover is arranged to swing about an axis running along a side of the tray that is toward the driver's seat from the position closing the open face of the tray to the position that is toward the driver's seat and uncovers the open face of the tray;

wherein the cover can swing from the position closing the open face of the tray to a position that is inclined downwardly toward the driver's seat and uncovers the open face of the tray; and wherein the tray comprises a side that is toward the driver's seat and that comprises a downwardly inclined surface against which the cover is disposed when the cover is in the position that is inclined downwardly toward the driver's seat and uncovers the open face of the tray.

2. The vehicle driver/passenger compartment set forth in claim 1 wherein the cover comprises a face that, when the cover is in the position that is inclined downwardly toward the driver's seat and uncovers the open face of the tray, faces toward the driver's seat and further including a clip for holding sheet material on the cover face.

3. The vehicle driver/passenger compartment set forth in claim 2 comprising a hinge that provides an axis about which the cover swings, the hinge comprising a first part attached to the cover and a second part attached to the tray, one of the first and second parts having separable attachment to one of the cover and the tray.

4. The vehicle driver/passenger compartment set forth in claim 3 wherein the part attached to the tray has a separable magnetic attachment to the tray, the separable magnetic attachment of the part attached to the tray being provided by a magnet disposed on the tray.

5. The vehicle driver/passenger compartment set forth in claim 4 wherein the cover has a separable magnetic attachment to the tray at a margin of the cover opposite the hinge when the cover is closing the open face of the tray, the separable magnetic attachment of the cover to the tray at a margin of the cover opposite the hinge being provided by a magnet disposed on the tray.

6. The vehicle driver/passenger compartment set forth in claim 1 including a latch that, when the closure assumes the generally horizontal position closing the open face of the basin, can be turned on the basin into and out of overlying relationship to the closure for interference and non-interference with movement of the closure to the generally horizontal position that is toward the driver along side the open face of the basin and uncovers at least a portion of the open face of the basin.

* * * * *